(12) United States Patent
Fidler

(10) Patent No.: US 8,649,270 B2
(45) Date of Patent: Feb. 11, 2014

(54) DYNAMIC NETWORK CONFIGURATION

(75) Inventor: Mark W. Fidler, Granite Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1139 days.

(21) Appl. No.: 12/609,255

(22) Filed: Oct. 30, 2009

(65) Prior Publication Data

US 2011/0103229 A1 May 5, 2011

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................................... 370/241

(58) Field of Classification Search
USPC ........................................................... 370/241
See application file for complete search history.

(56) References Cited

U.S. PATENT DOCUMENTS

| 2005/0255886 | A1* | 11/2005 | Aaltonen et al. | 455/558 |
| 2006/0046730 | A1* | 3/2006 | Briancon et al. | 455/446 |
| 2007/0254714 | A1 | 11/2007 | Martich et al. | |
| 2009/0180429 | A1* | 7/2009 | Stevens et al. | 370/329 |
| 2010/0020710 | A1* | 1/2010 | Gupta et al. | 370/252 |

* cited by examiner

*Primary Examiner* — Huy D Vu
*Assistant Examiner* — Adnan Baig

(57) ABSTRACT

A method comprises monitoring a network for an event. The network includes wireless access points through which wireless users access the network and a plurality of virtual service communities allocated to one or more of the wireless access points. Each virtual service community (VSC) is configured for one or more network services. The network services associated with one VSC includes at least one network service that is different than the network services of another VSC. The method further comprises detecting the event; and based on the occurrence of the detected event, performing an action that includes dynamically allocating a VSC to an access point.

18 Claims, 3 Drawing Sheets

DYNAMIC NETWORK CONFIGURATION

BACKGROUND

For wireless networks, the types of applications as well as the types of users may vary over a period of time (e.g., throughout the day, week, month, year, etc.). This variation can lead to inadequate bandwidth for certain configured services with overall system capacity not being as efficiently utilized as possible. Wireless networks are statically configured by a network administrator. Any changes to the configuration of a network are generally manually performed by the administrator. Large networks having hundreds or more of access points and services running thereon can be very difficult to manage by an administrator.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
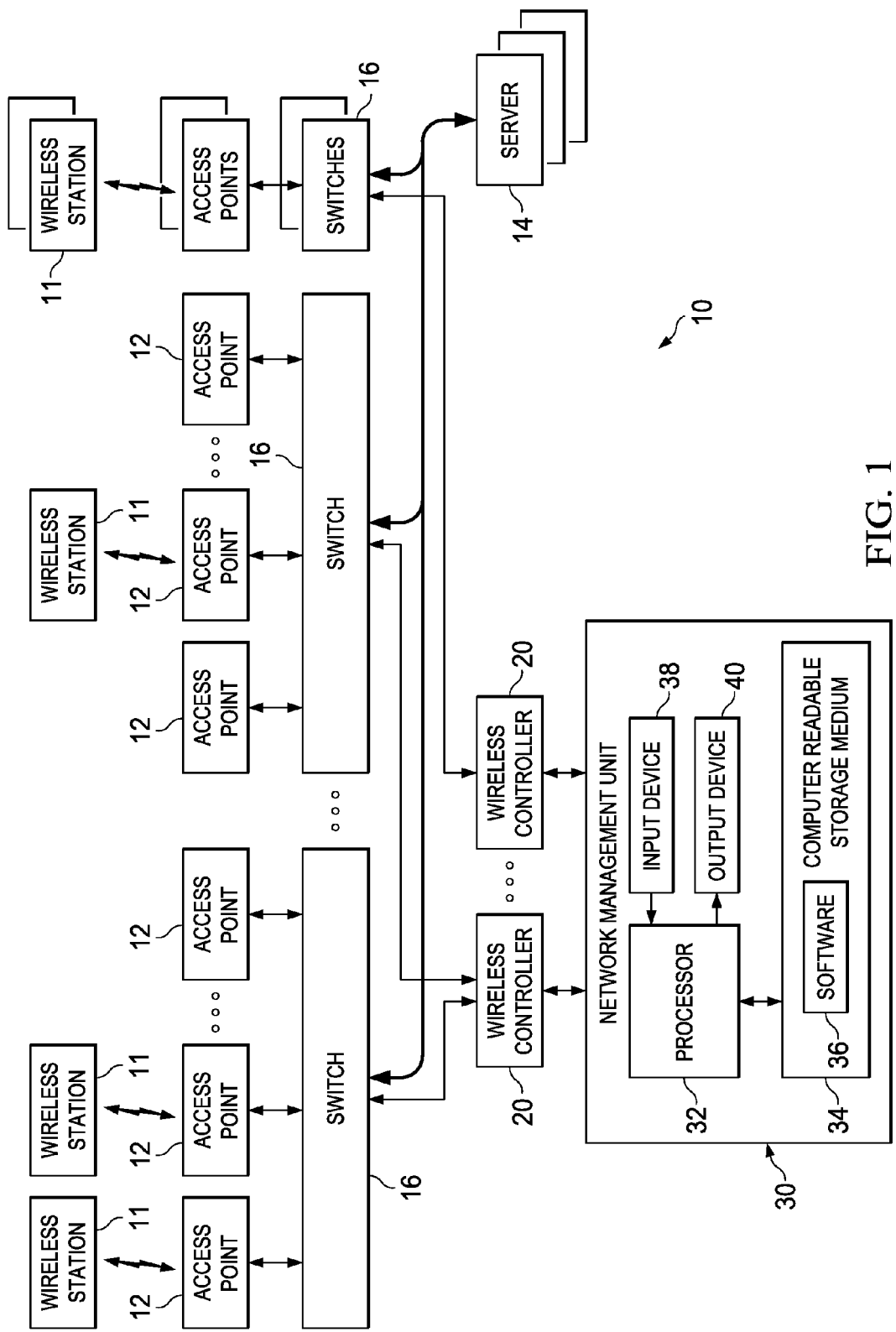
FIG. 1 shows a system in accordance with various embodiments.

FIG. 1 shows a network 10 which comprises one or more wireless stations (WSTA) 11, one or more access points (APs) 12, one or more switches 16, one or more wireless controllers 20, and a network management unit 30. Each wireless station 11 comprises any type of device that communicates wirelessly with one or more of the access points 10. Examples of wireless stations 11 include computers, personal data assistants, cell phones, smart phones, vending machines, parking meters, and other types of equipment that have wireless capability.

Each access point 12 contains at least one radio for wireless communication to one or more of the wireless stations 11. Each access point 12 also contains a wired or wireless network connection (e.g., Ethernet connection) to other network equipment such as a switch 16. Each switch 16 has multiple ports and each port can be connected to a separate access point 12. In some embodiments, for example, each switch 16 can be connected to 8 or 16 access points. Through the access points, wireless user-access devices (wireless stations 11) can be coupled to the switches. Further, wired user-access devices (e.g., computers with wired network connections) can also be connected to the various switches 16. The switches 16 couple to one or more network computing devices 14 (e.g., server computers). Network computing devices 14 host various applications that can be accessed and used by the various wireless stations 11.

The switches 16 also couple to wireless controllers 20. Each wireless controller 20 can be coupled to multiple switches 16. The wireless controllers 20 couple to the network management unit 30. The network management unit 30 comprises one or more processors 32 coupled to a computer-readable storage medium (CRSM) 34, an input device 38, and an output device 40. The input device 38 may include a keyboard, mouse, etc. usable by a user of the network management unit 30. The output device 40 may include a display viewable by a user of the network management unit 30. The CRSM 34 comprises volatile memory (e.g., random access memory), non-volatile storage (e.g., hard disk drive, compact disc read only memory (CD ROM)), or combinations thereof. The CRSM 34 contains software 36 that is executable by the processor 32 to provide the network management unit 30 with some or all of the functionality described herein as being attributed to the network management unit 30. The network management unit 30 may be implemented as a single computer. Alternatively, the functionality of the network management unit 30 may be distributed across multiple servers.

The wireless controllers 20 configure the network services that are assigned to the various access points 12. In one example, a user of the network management unit 30 can access a graphical user interface (GUI) implemented by software 36 and displayed on output device 40 to configure one or more virtual service communities. A virtual service community (VSC) defines a set of services that can be assigned to one or more access points 12. Examples of the types of services configurable within a VSC include, but are not limited to:
(1) authentication methods
(2) quality of service (QOS) parameters
(3) access rights
(4) traffic shaping parameters
(5) data rate limits
(6) number of users allowed per access point radio
(7) ingress and egress virtual local area network (VLAN) parameters
(8) security parameters such as IP/MAC filtering, isolation of wireless clients, tunnel protocols, etc.
(9) Wireless Users Home Network
(10) Wireless monitoring and/or wireless security parameters Each VSC identifies the service set identifier (SSID) that is to be used in association with the service set and whether the SSID will be broadcast or not. By way of an example, a university may own and operate a network throughout its campus. VSCs may include, for example, Guest Access VSC, Medical Student VSC, Law Student VSC, Faculty VSC, Math Department VSC, Chemistry Department VSC, Alumni VSC, Security VSC, etc. Some of the VSCs for the university may have the same settings for some of the services (e.g., the QOS parameters), but have different settings for other services. For example, the Chemistry Department VSC may be configured for a different data rate limit than the Guest Access VSC.

Through the network management unit 30, the various VSCs can be configured and assigned to one or more of the APs 12. Multiple VSCs can be assigned to a single AP if desired. For example, an AP in the faculty lounge of the Chemistry Department may be associated with both the Chemistry Department VSC and the Faculty VSC. To a user of wireless station 11, an AP 12 with multiple VSCs will appear to be multiple APs. Thus, a faculty member in the faculty lounge of the Chemistry Department may cause his or her wireless station 11 to examine the wireless medium for wireless networks within communication range and may observe two nearby wireless networks corresponding to the Faculty VSC and the Chemistry Department VSC even though both VSCs are associated with the same AP 12.

In accordance with at least some embodiments, "groups" of access points may be defined. Groups may be defined by physical location or by logical function. An example of a group based on physical location is a group that includes all APs 12 in the chemistry building. An example of a group based on logical function is a group of APs 12 that to which faculty members can access. The VSCs may be assigned to such groups. For example, the Chemistry Department VSC may be assigned to the chemistry building group of APs 12.

In accordance with various embodiments, a user of the network management unit 30 may specify one or more "events" to be monitored in the network. Different types of events can be monitored. One or more actions are associated with each event, and such actions automatically are performed by the network management unit 30 upon detection of the events. Examples of actions are provided below. The user of the network management unit 30 specifies both the events and the associated actions to be taken upon detection in the network of an event.

In one example of an event, a user of the network management unit 30 may specify one or more thresholds associated with the network. The violation of such a threshold represents an event. In general, a threshold corresponds to a performance level of the network. Examples of thresholds include the number of users of a particular access point or VSC reaching a specified number, the data rate through a given access point or VSC reaching a specified level, etc. For each such threshold, the user may also specify and associate one or more rules. Each rule specifies what action(s) should be taken upon determination that the threshold has been violated.

Other examples of events include scheduled events. For example, the first weekend in each October at a particular university may be "parents weekend" in which the number of guests on campus is dramatically higher than otherwise. Such guests may have wireless stations and desire access to the university's network. The increase in the number of guest users may best be accommodated by an increase in data rate of various VSCs, an increase in the number of enabled access points 12 across campus, etc. Another example of a scheduled event is night time (versus daytime). For an organization, typically usage of a network changes dramatically at night compared to during normal working hours. A scheduled event could include normal business hours (e.g., 8 am to 6 pm), while another scheduled event could be night time hours (e.g., 6 pm to 8 am). Other scheduled events could include class time, transition time between classes, weekends, etc.

Another example of events includes manually-triggered events. For example, someone pulling the fire alarm could be defined as an event. Or someone may interact with the network management unit 30 (possibly via a wireless station 11) upon detection of a security threat on campus to cause the network management unit 30 to enter a security mode.

The network management unit 30 monitors the network 10 for one or more or all of the events specified by the user. Upon detecting the occurrence of an event, the network management unit 30 performs one or more associated actions.

In one example, an action may be for the network management unit 30 to dynamically allocate a VSC to an access point. For instance, upon the occurrence of a scheduled event (e.g., parents weekend), the network management unit 30 may assign a Guest VSC to various or all of the APs 12 on campus to accommodate the anticipated influx of guests.

By way of another example, an action may comprise dynamically changing a configuration of services of an existing VSC (e.g., changing the data rate limit of a particular VSC).

In yet another example, an action may include enabling or disabling one or more APs 12. In accordance with some embodiments, each AP 12 comprises an Ethernet connection to a switch 16 or other networking device. In at least some embodiments, the switch 16 may implement Power Over Ethernet (PoE, IEEE 802.3af) whereby electrical power to the AP is supplied over the Ethernet connection itself, and thus the power state of the AP can be controlled by the networking device to which the AP 12 connects (e.g., a switch 16). In other embodiments, a command can be transmitted to the AP 12 to cause the AP to transition to a lower or higher power state (e.g., idle, standby, fully operational, etc.). Enabling and disabling an AP 12 includes both turning power on/off to the AP as well as causing the AP to change power states.

In yet another example, an action may comprise the network management unit 30 providing a recommendation for a change in the network configuration on, for example, output device 40. A user of the network management unit 30 thus will be prompted to accept or reject the recommendation. Accepting the recommendation results in the network management unit 30 implementing the recommendation. In some embodiments, the recommendation may be for a person to perform one or more tasks such as installing one or more additional APs 12 in a particular geographic area.

Figure 2:
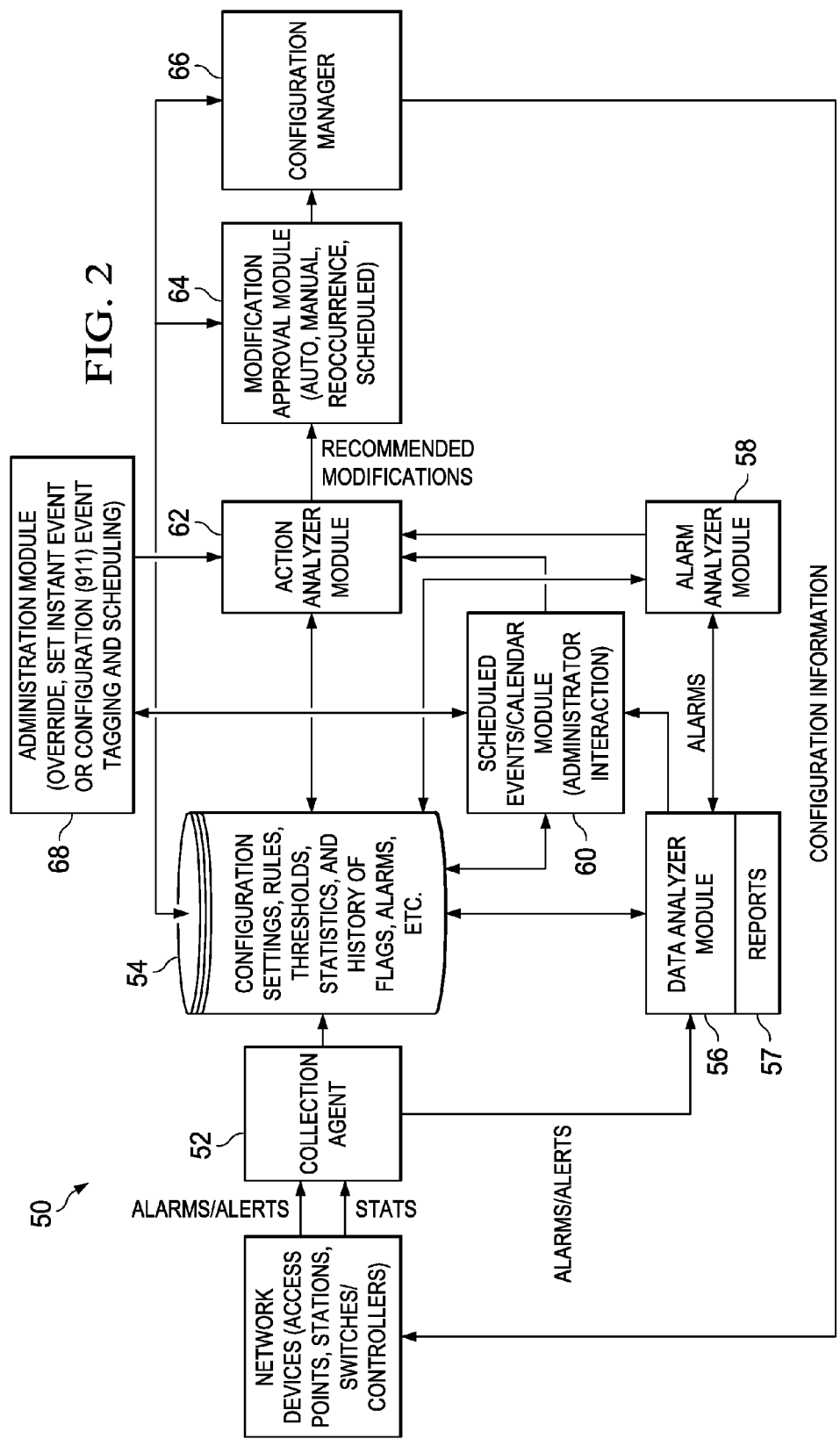
FIG. 2 shows a system diagram of the functionality of a network management unit in accordance with various embodiments.

The network management unit 30 thus permits a user to specify various events and associated actions to be performed upon the detection of such events, as well carrying out the actions at the appropriate time. Some or all of the functionality of the network management unit 30 is performed by one or more processors 32 executing software 36. FIG. 2 provides a functional diagram 50 of the various functions performed by such software in accordance with at least one embodiment.

Referring to FIG. 2, the network management unit's software 34 performs the various functions shown. The collection agent 52 collects operational information about the network from the various network devices such as wireless stations 11, APs 12, switches 16, and wireless controllers 20. Such operational information may include statistical data (e.g., data characteristics, error rates, number of users of a given AP/VSC) as well as various alarms and alerts. An alert may represent an early warning that the state of the network may be approaching a situation in which a configuration change may be needed or desired, but a critical threshold has not been reached. After an event has been analyzed, an alarm may be generated. An alarm may indicate that the network may not be meeting a desired minimal level of service and a configuration change is likely needed. Database 54 stores configuration settings, rules, and thresholds as well as statistics and alarms collected by the collection agent. The database 54 also stores the locations of the various access points 12. Such locations are known to the personnel that installs the access points and is added to the database 54. Additionally or alternatively, access point location may be discovered automatically (e.g., based on known location of other access points on the same subnet or in wireless communication range). The collection agent 52 forwards the alarms and alerts to a data analyzer module 56 which generates corresponding reports 57. Data analyzer 56 also can generate its own events/alarms based on the combination of the alarms/events collected by other devices and also by analyzing the raw data and statistics provided to the database 54. Alarms are also provided to an alarm analyzer module 58 which prioritizes the alarms and presents them along with a potential action to the action analyzer module 62. The alarm analyzer module 54 will check all actions with mandatory rules prior to passing actions to the action analyzer module 62. (e.g., VSC administrator may never appear on APs not in group Secure-ADMIN, or VSC EmergVOICE will always appear on APs in group Hospital). The action analyzer module 62 could receive multiple conflicting alarms. In such a situation, the action analyzer determines which alarm has the higher priority. The action analyzer module 62 also receives notices of the occurrence of scheduled events from a scheduled events/calendar module 60 as well as notices of threshold violations from database 54. The action analyzer 62 assesses such input information and provides recommended network configuration changes to the modification approval module 64. An administrator module 68 permits a user to override various threshold violations to prevent a threshold violation from automatically triggering a configuration change, manually set one or more events (e.g., an emergency event), as well as manually change a configuration of the network. The user may use the administration module 68 to tag a subset of the collected operational data as a scheduled event (e.g., noticing a rise in guest usage during the first weekend in October). Tagging such operational data as a scheduled event includes, for example, saving the state of the network or a portion of the network so that it may be duplicated in the future. The state of the network may comprise an inventory of the network components, location of the components, the configuration of the components as well as statistics gathered during that particular configuration. Such tagged events are considered to be possibly recurring events. Some configurations may be predefined, such as the state of the network during an emergency situation, but may not have ever happened yet. When an event is scheduled, the scheduled events/calendar module 60 will check the current network equipment to determine if it matches the tagged event. If there is a mismatch, the scheduled events/calendar module 60 warns of such discrepancies and recommends one or more configuration changes to address the discrepancy and bring the state of the network in compliance with what is required for the event. The scheduled events/calendar module 60 can also request a report for the last time the scheduled event occurred to give visibility into any other modifications that the administrators may wish to make to the scheduled event configuration before the next occurrence of the event.

Upon changing a configuration of the network, the current configuration can be saved into database 54. Saving an old configuration may allow a rollback to a prior configuration as desired. Further, the network management unit may take a snapshot of the existing configuration of the network and save that snapshot in database 54.

The modification approval module 64 may automatically implement the recommended network configuration changes (e.g., without approval by a person), or may prompt a user to accept or reject the recommended change. As a result, the configuration manager reconfigures the network devices (APs, switches, etc.), services, and/or VSCs as explained above.

Figure 3:
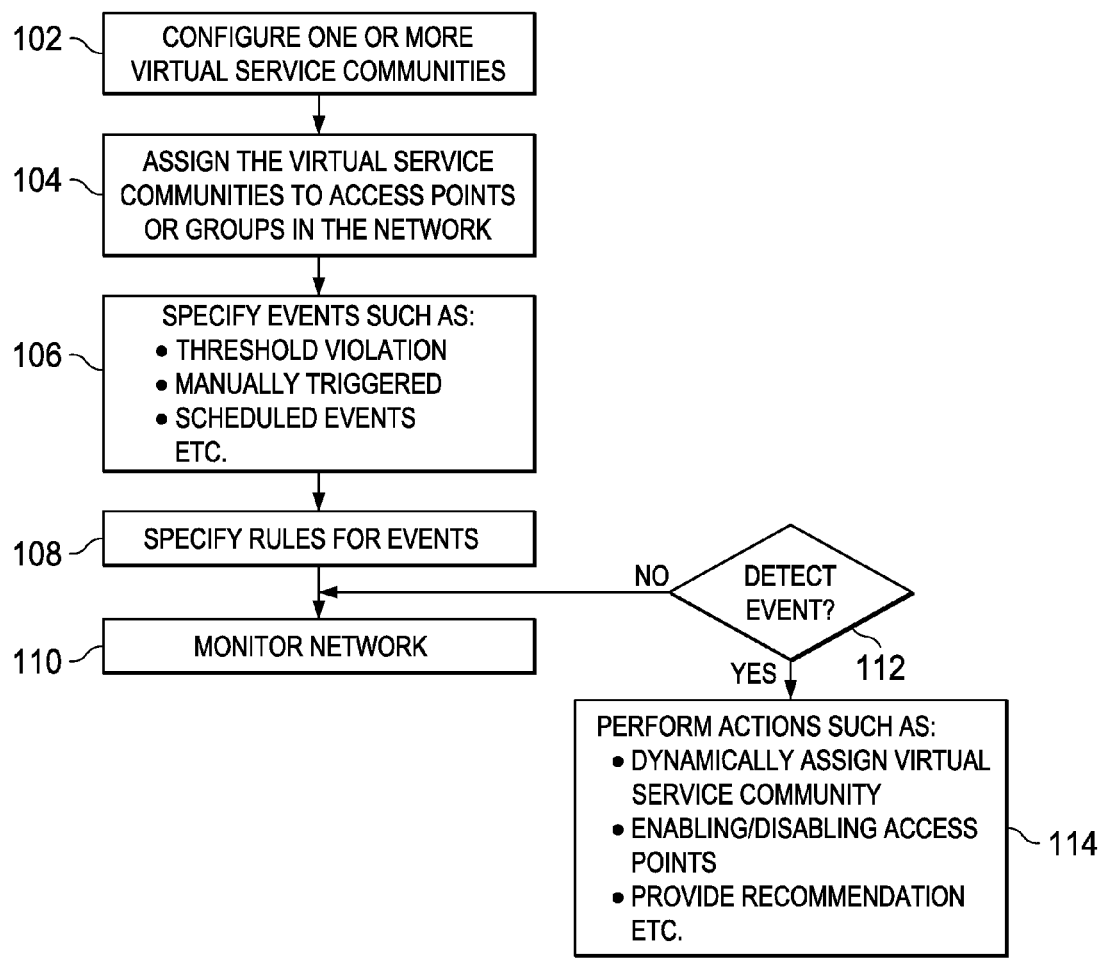
FIG. 3 shows a method in accordance with various embodiments.

FIG. 3 illustrates a method performed in accordance embodiments of the invention. The actions listed in FIG. 3 can be performed in the order shown or in a different order. Further, some of the actions can be performed in parallel with another action. In accordance with various embodiments, some or all of the actions FIG. 3 are performed by or using the network management unit 30 (e.g., processor 32 executing software 36).

At 102, a user of the network management unit 30 configures one or more VSCs and at 104, the VSCs are assigned to APs 12 or AP groups. At 106, the user also specifies one or more events such as those noted above (e.g., threshold violations, manually triggered events, and scheduled events. At 108, one or more rules for each event are specified to define what action(s) should be taken if the associated event is detected.

The network operates with such APs and VSCs. At 110, the network is monitored by, for example, the network management unit 30 collecting network operational data from the various APs 12, switches 16, etc. If the occurrence of an event is detected (112), then the corresponding action is performed. Examples of such actions include those mentioned above such as dynamically assigning one or more VSCs to one or more APs 12, enabling/disabling one or more APs 12, providing a recommended change to one or more VSCs' configuration (i.e., set of services).

The embodiments described herein treat the APs 12 as a flexible pool of devices in which dynamic configuration will result in better resource utilization as well as higher levels of service to wireless users. As more APs are added in new or existing coverage areas, such additional APs will be added to the pool of APs thereby increasing the flexibility in configuration by the disclosed embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    monitoring a network for an event, said network including access points through which wireless users access the network and a plurality of virtual service communities allocated to one or more of said access points, each virtual service community (VSC) configured for one or more network services, and wherein the network services associated with one VSC includes at least one network service that is different than the network services of another VSC;
    detecting, by a processor, the event; and
    based on the occurrence of the detected event, performing, by the processor, an action that includes dynamically allocating a VSC to an access point,
    wherein monitoring the network comprises collecting operational information about the network, and
    wherein detecting the event comprises using the collected operational information and tagged operational information to detect the event.

2. The method of claim 1 wherein said action further includes dynamically changing a configuration of services of a VSC.

3. The method of claim 1 wherein said action further includes enabling or disabling an access point.

4. The method of claim 1 wherein said action further includes providing a recommendation for a change to a configuration of the network.

5. The method of claim 1 wherein said event includes at least one event selected from a group consisting of a scheduled event, a manually-triggered event, and a performance level exceeding a threshold.

6. The method of claim 5 further comprising specifying the threshold and associating a rule to the threshold, said rule specifying said action to be performed upon the threshold being violated.

7. The method of claim 1 further comprising tagging a subset of operational information as the tagged operational information.

8. An electronic system, comprising:
one or more processors; and
storage containing software that is executable by said one or more processors;
wherein said software causes said one or more processors to:
monitor a network for an event, the network including access points through which wireless users access the network and a plurality of virtual service communities allocated to one or more of said access points, each virtual service community (VSC) configured for one or more network services, and wherein the network services associated with one VSC includes at least one network service that is different than the network services of another VSC;
detect the event; and
based on the occurrence of the detected event, perform an action that includes dynamically allocating a VSC to an access point,
wherein, to monitor the network for the event, the one or more processors are to collect operational information about the network, and
wherein the collected operational information and tagged operational information are used to detect the event.

9. The electronic system of claim 8 wherein the action performed by the one or more processors further includes dynamically changing a configuration of services of a VSC.

10. The electronic system of claim 8 wherein the action performed by the one or more processors further includes enabling or disabling an access point.

11. The electronic system of claim 8 wherein the action performed by the one or more processors further includes providing a recommendation for a change to a configuration of the network.

12. The electronic system of claim 8 wherein the event includes at least one event selected from a group consisting of a scheduled event, a manually-triggered event, and a performance level exceeding a threshold.

13. The electronic system of claim 12 wherein said software causes said one or more processors to permit a user to specify a threshold and associate a rule to the threshold, the rule specifying the action to be performed upon the threshold being violated.

14. The electronic system of claim 8 wherein the one or more processors are caused to permit a user to tag a subset of operational information as the tagged operational information.

15. A method, comprising:
tagging, by one or more processors, a subset of operational information as a scheduled event;
monitoring a network for the scheduled event;
detecting, by the one or more processors, an occurrence of said scheduled event; and
based on the occurrence of said detected event, performing an action, by the one or more processors, comprising re-configuring a network accessed by wireless users or making a recommendation for a change to a configuration of the network.

16. The method of claim 15 further comprising defining the action and associating the action with the scheduled event.

17. The method of claim 15 wherein reconfiguring the network comprises performing at least one of dynamically allocating a virtual service community (VSC) to an access point and enabling or disabling an access point.

18. The method of claim 15 further comprising associating the action with the scheduled event.

* * * * *